April 1, 1941.   B. H. KARMEN   2,236,641
FOOD PRODUCT AND THE PROCESSING THEREOF
Filed June 27, 1938
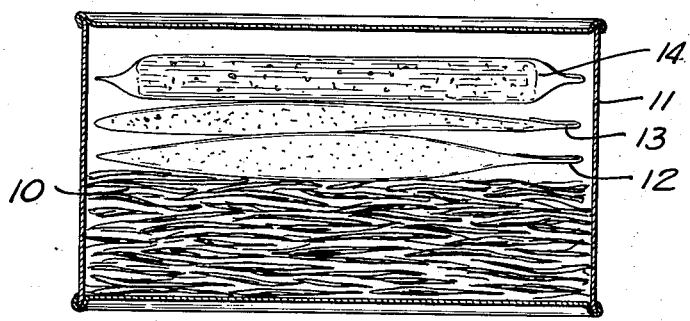
INVENTOR
BERNARDO H. KARMEN
BY
ATTORNEYS Patented Apr. 1, 1941

2,236,641

UNITED STATES PATENT OFFICE 2,236,641

FOOD PRODUCT AND THE PROCESSING THEREOF

Bernardo H. Karmen, Los Angeles, Calif.

Application June 27, 1938, Serial No. 215,994

3 Claims. (Cl. 99—124)

This invention relates generally to food products, and more particularly to the ingredients for soups.

An object of the invention is to provide a process of treating onions so that the resulting product will remain chemically stable and free from deterioration for an indefinite period of time, for use primarily in the making of onion soup, when mixed with other ingredients including a dry concentrated powdered soup stock.

Another object of the invention is to provide a food product which is packaged in a vacuum sealed receptacle containing the onions processed as aforestated; the powdered soup stock; grated cheese; and cheese croutons, so that by following simple directions a most delicious, appetizing and nourishing soup can be cooked with the utmost ease and dispatch without requiring the knowledge of an expert soup cook.

With these and other objects in view, the invention resides in the product and the process for producing same as set forth in the following specification, and particularly pointed out in the appended claims.

In the accompanying drawing, the figure is a sectional view of a vacuum sealed receptacle with the several ingredients separately packaged therein.

In carrying the invention into practice, a suitable quantity of onions are thinly sliced and then subjected for a predetermined period of time to heat of sufficient intensity to process the onions to a brown color in a suitable fat.

Following this treatment, the fat is drained from the onions, and the latter permitted to cool. The onions are then further processed to remove moisture and any fatty residue, so that the resulting product will be practically fat and moisture free. In this dry state, the onions will keep without deterioration for an indefinite period of time, and will retain substantially all their original vitamins, as only water and the fat used in the processing of the onions with heat have been removed.

A measured amount of the processed onions, indicated at 10, is now packed in a suitable receptacle, such as a metal can 11. Other ingredients, contained in separate packages 12, 13 and 14, are also packed in the can, and consist of a measured quantity of dry soup stock, grated cheese, and cheese croutons, after which the can is vacuum sealed.

The product can now be marketed, and enables a delicious and nourishing onion soup to be prepared by an inexperienced cook, by the simple expedient of cooking the onions and soup stock in a predetermined quantity of water for a time sufficient to bring out the full flavor of the ingredients.

The finished product composed of the above described ingredients retains the necessary onion flavor to produce a home-made onion soup capable of being prepared with ease and with a saving of time of from three to four hours ordinarily required to make a perfect product.

Heretofore it has been impossible to obtain on the market commercially an onion soup canned in liquid form, which has a home-made tasting flavor, as is obtained with applicant's invention.

What is claimed is:

1. The method of treating onions which comprises subdividing the onions; processing the onions with heat in the presence of fat until the onions turn brown; and then removing only the moisture from the onions so that the product will retain its vitamin content and will be in a dry state preserving the product without deterioration over an indefinite period of time.

2. The method of treating onions to produce a dry preserved product, which comprises dividing the onions in pieces; immersing the onions in fat while subjecting them to heat at a temperature sufficient to turn them brown in color; and then subjecting the onions to the action of a drying agent until the product has been freed from substantially all moisture without loss of vitamin content.

3. A commodity for the preparation of onion soup comprising a measured quantity of moisture and fat free cooked onions; a packaged and measured quantity of dry, concentrated powdered soup stock; a packaged quantity of grated cheese; packaged cheese croutons; and a vacuum-sealed receptacle containing the aforestated ingredients.

BERNARDO H. KARMEN.